(12) United States Patent
Nousiainen et al.

(10) Patent No.: US 10,815,428 B2
(45) Date of Patent: *Oct. 27, 2020

(54) PROCESS FOR PURIFICATION OF BIOLOGICAL FEED MATERIAL

(71) Applicant: UPM-KYMMENE CORPORATION, Helsinki (FI)

(72) Inventors: Jaakko Nousiainen, Lappeenranta (FI); Jari Kotoneva, Lappeenranta (FI); Heli Laumola, Helsinki (FI); Teemu Lindberg, Lappeenranta (FI); Kosti Mokkila, Tuusula (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 540 days.

This patent is subject to a terminal disclaimer.

(21) Appl. No.: 14/395,168

(22) PCT Filed: Apr. 17, 2013

(86) PCT No.: PCT/FI2013/050428
§ 371 (c)(1),
(2) Date: Oct. 17, 2014

(87) PCT Pub. No.: WO2013/156683
PCT Pub. Date: Oct. 24, 2013

(65) Prior Publication Data
US 2015/0052807 A1    Feb. 26, 2015

(30) Foreign Application Priority Data

Apr. 18, 2012    (FI) .................................... 20125422

(51) Int. Cl.
*C10G 3/00*    (2006.01)
*C10G 67/02*    (2006.01)
(Continued)

(52) U.S. Cl.
CPC ............. *C10G 3/50* (2013.01); *C10G 3/42* (2013.01); *C10G 3/46* (2013.01); *C10G 21/20* (2013.01);
(Continued)

(58) Field of Classification Search
CPC ..... C10L 2200/0469; C10L 2200/0484; C10G 3/42; C10G 3/50; C10G 67/02
See application file for complete search history.

(56) References Cited

U.S. PATENT DOCUMENTS 3,644,179 A * 2/1972 Knoer .................... B01D 3/148
530/205
4,076,700 A * 2/1978 Harada ................. C11B 13/005
203/72
(Continued)

FOREIGN PATENT DOCUMENTS

CA    2792078 A1 *    9/2011    ................ C10L 1/08
EP    2290045 A1 *    3/2011    ................ C11B 3/06
(Continued)

OTHER PUBLICATIONS

International Search Report dated Jul. 18, 2013, corresponding to PCT/FI2013/050428.
(Continued)

*Primary Examiner* — Ellen M McAvoy
*Assistant Examiner* — Ming Cheung Po
(74) *Attorney, Agent, or Firm* — Cantor Colburn LLP

(57) ABSTRACT

The present invention relates to a process for the purification of biological feed material and to a process for catalytically converting the purified biological feed material into hydrocarbons suitable as biofuel components. The purified feed material is treated in a reactor system including a catalytically active guard bed phase and a catalytically active main reaction phase. At least one of the phases includes a catalyst
(Continued)

bed with a combination of hydrodeoxygenating (HDO) and hydrodewaxing (HDW) catalysts. The process provides biofuel with acceptable ignition and cold flow properties.

30 Claims, 4 Drawing Sheets

(51) Int. Cl.
| | |
|---|---|
| C10G 21/20 | (2006.01) |
| C10G 45/58 | (2006.01) |
| C10G 45/64 | (2006.01) |
| C10L 1/04 | (2006.01) |
| C10L 1/06 | (2006.01) |
| C10L 1/16 | (2006.01) |
| C10L 1/08 | (2006.01) |
| C10G 65/12 | (2006.01) |
| C10G 67/06 | (2006.01) |

(52) U.S. Cl.
CPC .............. *C10G 45/58* (2013.01); *C10G 45/64* (2013.01); *C10G 65/12* (2013.01); *C10G 67/02* (2013.01); *C10G 67/06* (2013.01); *C10L 1/04* (2013.01); *C10L 1/06* (2013.01); *C10L 1/08* (2013.01); *C10L 1/1616* (2013.01); C10G 2300/1011 (2013.01); C10G 2300/1014 (2013.01); C10L 2200/0469 (2013.01); C10L 2200/0484 (2013.01); C10L 2270/026 (2013.01); C10L 2290/541 (2013.01); Y02E 50/13 (2013.01); Y02P 30/20 (2015.11)

(56) References Cited

U.S. PATENT DOCUMENTS

| | | | | |
|---|---|---|---|---|
| 5,705,722 | A * | 1/1998 | Monnier | C07C 1/00 585/240 |
| 7,638,040 | B2 | 12/2009 | Van Wees et al. | |
| 8,608,812 | B2 | 12/2013 | Perego et al. | |
| 8,735,637 | B2 * | 5/2014 | Stigsson | C10L 1/026 44/605 |
| 9,175,228 | B2 * | 11/2015 | Nousiainen | C10G 3/42 |
| 2005/0033027 | A1 * | 2/2005 | Rohr | C11C 1/025 530/359 |
| 2005/0203279 | A1 * | 9/2005 | Rojas | C11B 13/005 530/205 |
| 2007/0010682 | A1 | 1/2007 | Myllyoja et al. | |
| 2009/0283442 | A1 | 11/2009 | McCall et al. | |
| 2010/0038284 | A1 * | 2/2010 | Vergel | B01J 8/0488 208/89 |
| 2010/0043279 | A1 | 2/2010 | Abhari et al. | |
| 2010/0113848 | A1 | 5/2010 | Strege et al. | |
| 2010/0228062 | A1 | 9/2010 | Babicki et al. | |
| 2011/0042267 | A1 | 2/2011 | Hayasaka | |
| 2011/0049012 | A1 * | 3/2011 | Stigsson | C10L 1/026 208/88 |
| 2011/0166396 | A1 | 7/2011 | Egeberg et al. | |
| 2012/0004479 | A1 * | 1/2012 | Hanks | C10G 3/42 585/256 |
| 2012/0016167 | A1 | 1/2012 | Hanks | |
| 2012/0260565 | A1 | 10/2012 | Nousiainen et al. | |
| 2012/0260656 | A1 | 10/2012 | Nousiainen et al. | |
| 2013/0245301 | A1 * | 9/2013 | Nousiainen | C10G 3/42 554/177 |

FOREIGN PATENT DOCUMENTS

| | | | |
|---|---|---|---|
| EP | 2111441 | 8/2016 | |
| WO | 2008101945 A1 | 8/2008 | |
| WO | 2009125072 A1 | 10/2009 | |
| WO | 2009131510 | 10/2009 | |
| WO | 2009151690 | 12/2009 | |
| WO | 2010/097519 | 9/2010 | |
| WO | 2010/128208 | 11/2010 | |
| WO | WO 2011095688 A2 * | 8/2011 | ............. C10G 45/08 |
| WO | WO-2011095688 A2 * | 8/2011 | ............. C10G 45/08 |
| WO | 2011117474 A | 9/2011 | |
| WO | 2011117474 A1 | 9/2011 | |
| WO | 2011148045 | 12/2011 | |
| WO | 2012/069705 | 5/2012 | |
| WO | 2012069704 A1 | 5/2012 | |
| WO | 2012069706 | 5/2012 | |
| WO | 2012143613 | 10/2012 | |

OTHER PUBLICATIONS

Finnish Search Report dated Mar. 8, 2013, corresponding to the Foreign Priority Application No. 20125422.
D. Liu, et al.; "Production of High Quality Cetane Enhancer from Depitched Tall Oil"; vol. 16, No. 5-6; Jun. 1, 1998; pp. 597-609.
Mikulec, J. et al, "Production of Diesel Fuels From Waste Triacyglycerols by Hydrodeoxygenation", 44th International Petroleum Conference, Bratislava, Slovak Republic, Sep. 21-22, 2009, 15 Pages.
Gruia, Adrian, "Hydrotreating", Handbook of Petroleum Processing, (David Stan, Ed.), Springer (2008); pp. 321-354.
Heinrich, Gerard, et al.,"Hydrotreating", Conversion Processes, vol. 3, (P. Leprince Ed.) in Petroleum Refining, Institut Francais du Petrol Publication, (2001); p. 560.
Mikulec, J.et al., "Catalytic Transformation of Tall Oil into Biocomponent of Diesel Fuel", International Journal of Chemical Enginneering, vol. 2012, Article ID 215258; 9 pages.
Norlin Lars-Hugo, "Tall Oil", (2005), Ullmann's Encyclopedia of Industrial Chemistry, Wiley-VCH Verlag GmbH & Co. KGaA, Weinheim; 14 pages.
Zinkel, D. F. et al., "Naval Stories", Pulp Chemicals Association, 1989; 22 pages.

\* cited by examiner

PROCESS FOR PURIFICATION OF BIOLOGICAL FEED MATERIAL

FIELD OF THE INVENTION

The present invention relates to a process for purifying biological feed material for the purposes of producing biofuels and components thereof. The present invention also relates to a process for producing biofuel or biofuel components from biological feed material, comprising purification of the feed material followed by a catalytic method. An embodiment of the invention relates to a process for producing biofuel from crude tall oil. The present invention further relates to the use of a product of the process as fuel or fuel additive and to diesel fuel produced by the process.

BACKGROUND OF THE INVENTION

Feed materials of biological origin i.e. biological feed materials are potential sources of various biofuels or biofuel components. These feed materials can be converted to biofuels for example by subjecting the feed material to catalytic hydroconversion with gaseous hydrogen. The resulting product stream can be further fractionated to form biofuel/biofuel components.

However, the use of these biological feed materials may cause for example poisoning and clogging of the catalyst material used in the production processes. Further, feed materials of biological origin contain various impurities, such as metals and solids that cause inactivation of the catalyst materials, coking on the catalyst and prevent it to function properly, as well as plugging and fouling in the process equipment. In order to prevent said events, the feed material can be purified and/or pretreated before feeding it to the hydroconversion process. Purifying of the feed materials of biological origin to be suitable for feeding to a catalytic process may in many cases be challenging. Various purification methods have been suggested, but the quality of the purified feed material is not always on a required level for carrying out the catalytic step in the most efficient way. Feed material of biological origin, for example crude tall oil (CTO) may be purified and/or pretreated by subjecting it to ion-exchange with a cationic and/or anionic ion-exchange resin prior to feeding to catalytic hydrotreatment process. Also other methods, such as adsorption on a suitable material or acid washing to remove alkaline metals and earth alkaline metals (Na, K, Ca) may be used. The adsorption material can be catalytically active or inactive. Yet another possibility is to use degumming for removing metals in the feed.

When the feed material of biological origin contains tall oil, depitching of the crude tall oil can also be used to remove impurities from the tall oil.

BRIEF DESCRIPTION OF THE INVENTION

In the process of the present invention, biological feed material is purified by using a heater and evaporator combination to obtain purified feed material.

According to one embodiment of the invention the purified feed material is treated in a reactor system comprising a catalytically active guard bed phase and a catalytically active main reaction phase. At least one of the phases comprises a catalyst bed with a combination of hydrodeoxygenating (HDO) and hydrodewaxing (HDW) catalysts. This process provides biofuel with acceptable ignition and cold flow properties.

Thus an object of the present invention is to provide a process for purifying feed material of biological origin for the purposes of producing biofuels and components thereof.

A further object of the present invention is to provide a process for converting biological feed material into hydrocarbons useful as fuel and/or additives for fuel.

A still further object of the invention is to provide a process suitable for converting tall oil components into hydrocarbons suitable for use as or in fuels.

A still further object of the invention is the use of a product of the process as fuel or fuel additive.

A still another object of the present invention is to provide a process to alleviate disadvantages of processes known in the art.

The objects of the invention are achieved by a process characterized by what is stated in the independent claims. Specific embodiments of the invention are disclosed in the dependent claims.

DETAILED DESCRIPTION OF THE INVENTION

Figure 1:
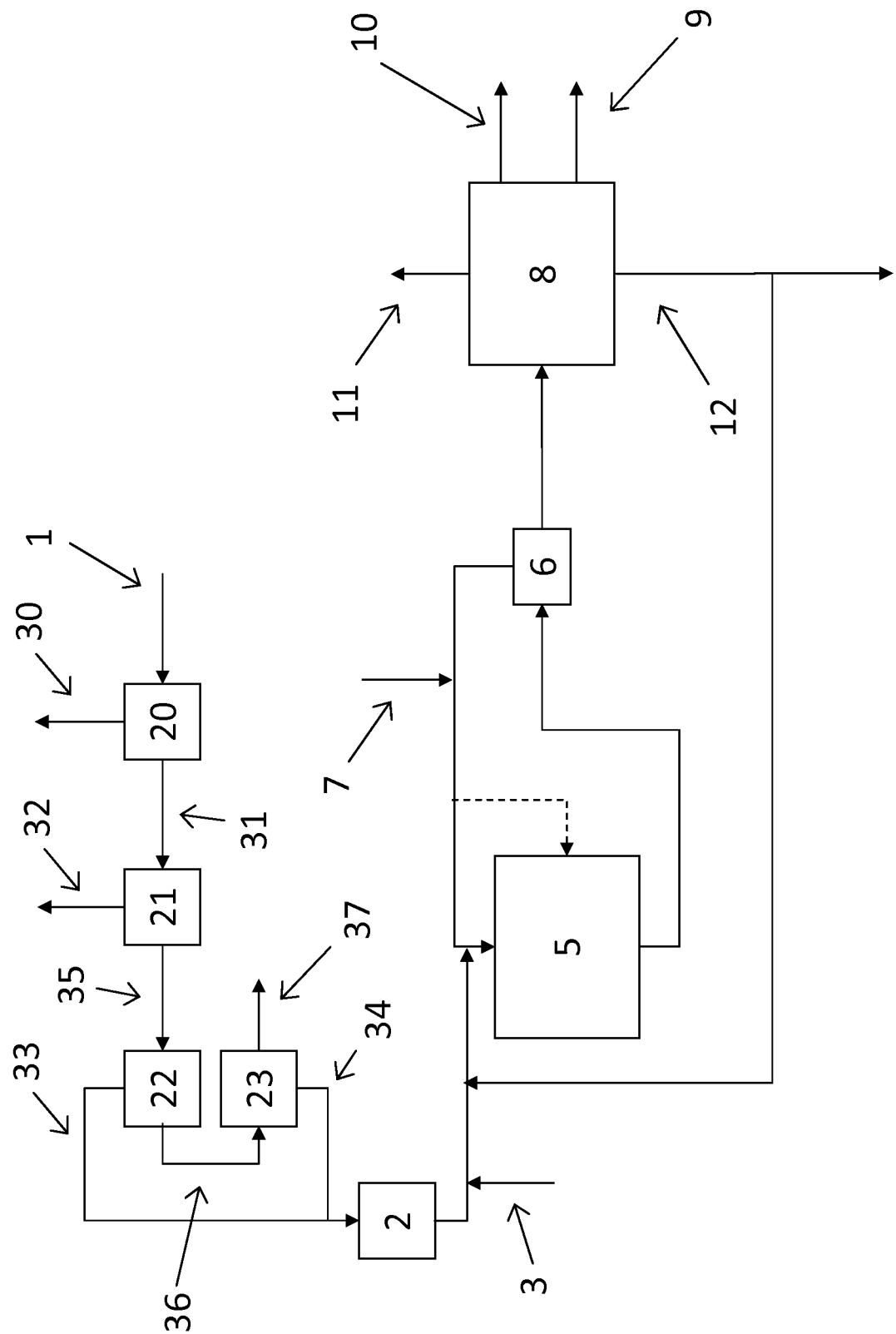
FIG. 1 shows a diagram illustrating an embodiment of the process of the invention.

The invention is based on the idea of purifying of feed material of biological origin to obtain purified fractions comprising compounds suitable as starting materials for hydroconversion processes. It was surprisingly found that impure biological feed material containing significant amounts of water and impurities may be utilized as starting material and the amount of residue is very small.

In the purification process in accordance with the present invention the biological feed material is purified in a heater and evaporator combination. Said combination suitably comprises a heater and a series of evaporators, suitably at least three evaporators, particularly suitably a heater and a series of three evaporators is used. The purified fractions (purified feed material) obtained in the process can be used as feedstock for the production of biofuels, such as biogasoline, biodiesel and/or components thereof.

The purifying of the biological feed material in accordance with the present invention is performed by a multistep evaporation process.

In the purification process of the present invention, the evaporation is accomplished in such a manner that the amount of residue from the evaporation is very small, thus very little of the potential feed material is lost with the residue.

For example when feed material comprising crude tall oil (CTO) or other tall oil materials and/or components is used, the residue may be 5% by weight or even less, calculated from the feed, which is a clear advantage over the prior art depitching processes, where the amount of the pitch residue from the evaporation may be as high as 20% to 35% by weight from the feed. As much as possible of the neutral components of the feed material are withdrawn with the recovered fractions for further utilization, instead of being withdrawn with the residue, as is the case in the prior art depitching processes.

In the multistep purification process of the invention, feed materials containing impurities and significant amounts of water may be used and still very high amounts of the feed compounds are available for further use in the catalytic conversion.

A further advantage of the purification process of the invention is that when biological feed material is purified, the impurities, such as metals and solids are retained in the concentrate and the condensate retrieved from the evaporation is ready to be fed to the catalytic hydroprocessing reactor.

When purifying feed material comprising CTO or other tall oil materials and/or components with the purification method of the invention, the feed material is first treated in the heater, where significant amounts of water and some light components are removed or evaporated from the feed material. This makes further evaporation steps more efficient. Also the risk of carry-over of non-desired residual substances into the distillate fraction in the further evaporation steps is reduced in a controlled way.

A further advantage of the purifying process is that the boiling takes place in a more controlled manner because low boiling light components, i.e. components having boiling point of 150-210° C., suitably 150-170° C., at a normal pressure, do not cause so much "carry over", i.e. migrating of the compounds having a boiling point range at the higher end of the above boiling point ranges as well as impurities to the vapor in the subsequent evaporation steps. The light components can be, if desired, returned back to the feed material of biological origin or refined further in another process or sold further as such.

A still further advantage of the purification process is that the heater and evaporators may be selected in each step in such a way that the yields, capacity and processability are at the highest level, however, taking also into account the overall cost-effectiveness.

A still further advantage is that the material purified according to the present invention is ready to be fed to catalytic hydroprocessing and the hydroprocessing is able to produce fuel components with excellent yields, because the feed material is not wasted in purification but the available feed fraction is maximized.

A further advantage of the present invention is that the heavy components generated from the pitch can be avoided in the product fractions. A still further advantage of the present invention is that the yield of the purified material from the evaporation is as high as from 80% to 95% and even from 88% to 95%.

According to another embodiment, the present invention relates to a catalytic process for producing biofuel or biofuel components, comprising purifying biological feed material in a heater and evaporator combination comprising a heater and a series of three evaporators to obtain purified biological feed material feeding of the purified biological feed material into a reactor system, which comprises a catalytically active guard bed phase and a catalytically active main reaction phase and wherein the purified biological feed material, in at least one catalyst bed of said phases, is contacted with a combination of hydrodeoxygenating (HDO) and hydrodewaxing (HDW) catalysts, treating the purified biological feed material catalytically with hydrogen in the reactor system to cause hydrodeoxygenation, isomerisation and cracking of feed material components to provide a hydroprocessing product, and recovering at least a fraction of the hydroprocessing product as biofuel or biofuel components.

In the above process of the invention a variety of hydrogen promoted (hydroprocessing) reactions take place on the catalysts. These reactions are necessary for converting the biological feed into acceptable fuel or fuel components. Providing a combination of active HDO and HDW catalysts in the same catalyst bed(s) in accordance with the invention enables the proceeding of all conversion reactions at the same time in said catalyst beds.

In an embodiment of the invention, the combination of HDO and HDW catalysts comprises mixture(s) or layers of the catalysts. The mixture(s) may be provided by physically mixing HDO and HDW catalyst particles or by adding HDO and HDW catalyst components onto same support material.

In an embodiment of the invention the main reaction phase comprises two or more main catalyst beds with their respective combinations of HDO and HDW catalysts. When the main reaction phase comprises two or more main catalyst beds, these typically operate in series. It is also possible to have main catalyst beds operating in parallel.

In an embodiment of the invention the proportion of HDW catalyst grows towards the outlet end of the reactor system. Some catalyst beds of the reaction phase typically comprise only one or the other of the catalyst types, i.e. they comprise either HDO or HDW catalyst.

In an embodiment of the invention the purified feed material after the guard bed phase passes through the main catalyst beds of the reactor system in series as a continuous flow without outlets for byproducts or other side streams. The main catalyst beds may be provided in one pressure vessel. In an embodiment of the invention the catalyst beds are split among several pressure vessels.

The treatment of the purified biological feed material with hydrogen, i.e. the hydroprocessing provides a mixture of gaseous and liquid hydrocarbons, water and some mostly gaseous by-products, such as $H_2S$, CO and $CO_2$. The liquid hydrocarbon product can be used as such or it may be fractionated to yield a variety of desired hydrocarbon fractions with different boiling points. In an embodiment of the invention a diesel fraction is recovered. Furthermore, a naphtha fraction can be recovered. A heavy fraction is typically also produced and it may be recovered or recirculated wholly or in part to the inlet end of the reactor system.

The invention also relates to the use of a hydrocarbon fraction produced by the process of the invention as a fuel or as an additive in fuel compositions. A middle distillate of the liquid hydrocarbon product comprises a fuel product having characteristics meeting specification EN 590 diesel. It comprises at least one hydrocarbon fraction produced by the process of the invention.

Even though the middle distillate of the process might not always meet all the EN 590 specifications, a fuel product meeting most of the specifications can be produced by the process. Thus, the process produces paraffinic fuel or fuel components which is/are similar to EN 590 diesel and which has/have low aromatic content, high cetane number and acceptable cold flow properties.

The catalytic process of the invention is operated in a reactor system, which comprises at least one catalytically active guard bed phase and at least one catalytically active main reaction phase. The two phases may be physically combined into one unit. At least one of said phases comprises a catalyst bed, wherein hydrodeoxygenating (HDO) and hydrodewaxing (HDW) catalysts are combined with each other.

The active HDO and HDW catalysts may be combined by being mixed with each other or they may be provided in separate layers or compartments within the same catalyst bed. The mixed catalysts may be provided by physically mixing different catalyst particles. The active catalytic components may also be combined during production of the catalyst, e.g. by being added onto the same support material(s). The catalyst layers may be provided by layering during packing of the bed.

The combination of the catalysts need not be uniform. Thus, a catalyst bed may contain more of the HDO or more of the HDW catalyst(s) in the flow direction. There may be different types of HDO catalysts and/or HDW catalysts in a bed. Similarly, there may be several layers of the various catalysts in a catalyst bed and the layers need not be of equal size. For example, when catalyst particles having different shapes and sizes are used, it may be advantageous to pack the catalysts into the bed in a graded manner to influence the operating pressure and temperature properties of the reactor. The reactor system typically also comprises catalyst beds with only one type of catalyst, i.e. HDO or HDW. Thus, for instance, the last catalyst bed of the main reaction phase may comprise only HDW catalyst.

The biological feed material can be any kind of animal and/or plant based material suitable for producing fuel components.

Suitably the biological feed material is selected from a group consisting of
i) any kind of fats, any kind of waxes, plant fats, plant oils, plant waxes; animal fats, animal oils, animal waxes, fish fats, fish oils, fish waxes, and
ii) fatty acids or free fatty acids obtained from plant fats, plant oils, plant waxes; animal fats, animal oils, animal waxes; fish fats, fish oils, fish waxes, and mixtures thereof, obtained for example by hydrolysis, and
iii) esters obtained from plant fats, plant oils, plant waxes; animal fats, animal oils, animal waxes; fish fats, fish oils, fish waxes, and mixtures thereof, obtained for example by transesterification, and
iv) metal salts of fatty acids obtained from plant fats, plant oils, plant waxes; animal fats, animal oils, animal waxes; fish fats, fish oils, fish waxes, and mixtures thereof, obtained for example by saponification, and
v) anhydrides of fatty acids from plant fats, plant oils, plant waxes; animal fats, animal oils, animal waxes; fish fats, fish oils, fish waxes, and mixtures thereof, and
vi) esters obtained by esterification of free fatty acids of plant, animal and fish origin, with alcohols, and
vii) fatty alcohols or aldehydes obtained as reduction products of fatty acids from plant fats, plant oils, plant waxes; animal fats, animal oils, animal waxes; fish fats, fish oils, fish waxes, and mixtures thereof, and
viii) recycled food grade fats and oils, and fats, oils and waxes obtained by genetic engineering, and
ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds, and
x) compounds derived from algae, molds, yeasts, fungi and/or other microorganisms capable of producing compounds mentioned in from i) to ix) or compounds similar to those, xi) bio-oils obtained from biomass by pyrolysis, comprising any of compounds from i) to ix) or compounds similar to those, and
xii) mixtures of said biological feed materials.

According to one embodiment of the present invention the biological feed material is selected from the group consisting of fish oils such as Baltic herring oil, salmon oil, herring oil, tuna oil, anchovy oil, sardine oil, and mackerel oil; plant oils such as rapeseed oil, colza oil, canola oil, tall oil, crude tall oil, sunflower seed oil, soybean oil, corn oil, hemp oil, linen seed oil, olive oil, cottonseed oil, mustard oil, palm oil, peanut oil, castor oil, *Jatropha* seed oil, *Pongamia pinnata* seed oil, palm kernel oil, and coconut oil; and animal fats such as lard, tallow, rendered lard and rendered tallow, and waste and recycled food grade fats and oils, as well as fats, waxes and oils produced by genetic engineering; animal waxes such as bee wax, Chinese wax (insect wax), shellac wax, and lanoline (wool wax); plant waxes such as carnauba palm wax, Ouricouri palm wax, jojoba seed oil, candelilla wax, esparto wax, Japan wax, rice bran oil, terpenes, terpineols and triglycerides or mixtures thereof.

In one embodiment, the feed material comprises non-edible plant oils or components thereof or derivatives thereof, for example obtained as by-products from the forest industry. In one embodiment of the invention, the feed material is composed of tall oil materials. Tall oil material comprises tall oil components, tall oil derivatives and any combinations thereof, including CTO, TOFA etc.

Tall oil material in connection with the present invention refers to a by-product of Kraft pulping of wood, especially coniferous wood. The tall oil material is typically a mixture of fatty acids, resin acids, neutral compounds and turpentine components originating from wood, especially coniferous wood. The turpentine components of tall oil are substantially composed of $C_{10}H_{16}$ terpenes.

In a further embodiment of the invention, the feed material is composed of crude tall oil (CTO). In a further embodiment of the invention, the feed material comprises tall oil components such as tall oil fatty acids (TOFA). A combination of CTO and TOFA may also be used. In an embodiment of the invention the feed material is selected from the group consisting of crude tall oil (CTO), tall oil fatty acids (TOFA), tall oil derivatives such as tall oil resin acids, tall oil pitch, tall oil neutral substances, as well as any mixtures thereof. Any one tall oil component or derivative may be used also as a feed material or may be combined with other tall oil derivatives, and with other biological oil feeds. The term "crude tall oil" or "CTO" refers to a product which is mainly composed of both saturated and unsaturated oxygen-containing organic compounds such as rosins, unsaponifiables, sterols, resin acids (mainly abietic acid and its isomers), fatty acids (mainly linoleic acid, palmitic acid, oleic acid and linolenic acid), fatty alcohols, sterols, other alkyl hydrocarbon derivatives, neutral substances, as well as inorganic impurities (alkaline metal compounds, sulphur, silicon, phosphorus, calcium and iron compounds). CTO also covers soap oil.

CTO refers to the processed mixture of naturally-occurring compounds extracted from wood species like pine, spruce and aspen. It is obtained from the acidulation of crude tall oil soap from Kraft and sulphite pulping processes used in paper making. The handling and cooking of the wood causes break down of the triglyceride structures and hence CTO does not contain any significant amounts of triglycerides. The composition of the CTO varies depending on the specific wood species.

The term "tall oil fatty acids" or "TOFA" refers to a product which is obtained from tall oil. In one embodiment of the invention, fatty acids or free fatty acids obtained from tall oil may be used as tall oil material, alone or as a mixture of other tall oil material.

In a further embodiment of the invention, soap oil may be used as the tall oil material for the feed. Also mixtures of soap oil and tall oil can be used as the tall oil material for the feed.

In the present invention, the biological feed material is purified before it is subjected to further treatments. Purification of the feed material facilitates the performance of the process of the invention. Purification is provided by utilizing a heater and a series of evaporators. Additionally the biological feed material may be subjected to one or more optional purification means, such as washing with washing liquid, filtering, distillation, degumming, depitching etc.

In an embodiment of the invention the purification of the feed material is provided by treating it in a combination of a heater and series of evaporators. A series of three or more evaporators at elevated temperatures and reduced pressures may be used. Suitably a heater and a combination of three evaporators are used. The multi-step evaporation takes place in a more controlled manner than in the prior art depitching methods and makes it possible to accomplish the evaporation so that the amount of residue removed by the purification is very small. In an embodiment of the invention, the purification process conditions are controlled in such a way that as much as possible of the neutral components of the tall oil material are recovered for further utilization instead of being withdrawn with the residue. The content of harmful substances, such as inorganic salts, metal ions, sulphur, phosphorus and lignin residuals in the feed material, such as in CTO raw material, is reduced by the purification. Purification of the feed material also enhances catalyst performance and lifetime.

In an embodiment of the invention, the whole amount of feed material or a part of it comprises purified tall oil material, suitably CTO. CTO can be carefully purified by evaporative treatments to remove light components such as crude sulphate turpentine (CST) and heavy components such as tall oil pitch. Such purified CTO material is eminently suitable for being subjected to catalytic treatment with hydrogen and for providing an acceptable biofuel product with a very high yield.

In the catalytic process of the present invention, the purified biological feed material is heated and fed into a reactor system, where it is subjected to catalytic hydrogenation, isomerisation and cracking on a mixture of catalysts capable of all of these reactions.

The catalytic process of the invention comprises reactions on at least two separate catalysts, one being a hydrodeoxygenation or HDO catalyst and the other a hydrodewaxing or HDW catalyst. One or more HDO catalysts and one or more HDW catalysts are combined with each other in at least one catalyst bed of the reactor system. The combination may be provided in different ways such as by mixing or layering. A mixture may be provided by physical mixing of catalyst particles or by adding catalyst metals onto the same support.

In the present invention, the HDO catalyst can be any HDO catalyst known in the art for the removal of hetero atoms (O, S, N) from organic compounds. In an embodiment of the invention, the HDO catalyst is selected from a group consisting of Ni—Mo, CoMo, and a mixture of Ni, Mo and Co. A NiMo catalyst has proven very efficient in the process of the invention. The support for the HDO catalyst can be any oxide which is typically used in the art as support for HDO catalysts. The support is typically selected from $Al_2O_3$, $SiO_2$, $ZrO_2$, and mixtures thereof.

In an embodiment of the invention, solid particles of $NiMo/Al_2O_3$ or, $NiMo/SiO_2$ are used. In another embodiment $CoMo/Al_2O_3$, or $CoMo/SiO_2$ is used. In a further embodiment $NiMoCo/Al_2O_3$ or, $NiMoCo/SiO_2$ is used. It is also possible to use a combination of HDO catalysts. The HDO catalyst(s) is/are sulphided prior to start up. Adequate sulphidation during operation is usually provided by organic sulphur compounds contained in the feed material.

In an embodiment of the invention, the HDW catalyst is selected from hydrodewaxing catalysts typically used for isomerising paraffinic hydrocarbon feeds. Examples of HDW catalysts include catalysts based on Ni, W, and molecular sieves.

NiW is a HDW catalyst which is useful in the invention. It has excellent isomerising and dearomatising properties and it also has the capacity of performing the hydrodeoxygenation and other hydrogenation reactions of biological feed materials, which are typically performed by HDO catalysts. Aluminosilicate molecular sieves and especially zeolites with medium or large pore sizes are also useful as HDW catalysts in the present invention. Typical commercial zeolites useful in the invention include for instance ZSM-5, ZSM-11, ZSM-12, ZSM 22, ZSM-23 and ZSM 35. Other useful zeolites are zeolite beta and zeolite Y.

The HDW catalyst is also supported on an oxide support. The support materials may be the same as or different from those of the HDO catalyst. In an embodiment of the invention the HDW catalyst is selected from $NiW/Al_2O_3$ and $NiW/zeolite/Al_2O_3$. These HDW catalysts are especially well suited for combining with the HDO catalyst of the invention since they also require sulphiding for proper catalytic activity.

In a specific embodiment, a catalyst bed of the main reaction phase of the reactor system comprises a combination of sulphided HDO and HDW catalysts, wherein the HDO catalyst is $NiMo/Al_2O_3$ and the HDW catalyst is $NiW/zeolite/Al_2O_3$. The $NiMo/Al_2O_3$ catalyst mainly serves the purpose of hydrogenation, hydrodeoxygenation, hydrodesulphurization and hydrodenitrification. The $NiW/zeolite/Al_2O_3$ catalyst mainly serves the purpose of hydroisomerisation, hydrogenation, hydrodearomatising, and hydrocracking. However, as mentioned above, NiW has the capacity also for some hydrodeoxygenation, hydrodesulphurisation and hydrodenitrification of the biological raw material.

In an embodiment of the invention the HDW catalyst is mixed with HDO catalyst in the first catalyst bed at the inlet end where the feed enters the main reaction phase. In case there are two or more catalyst beds in the main phase, the HDO and HDW catalysts are typically mixed in at least two of the main catalyst beds of the reactor system.

The proportion of HDO catalyst at the inlet end of the main reaction phase is typically higher than the proportion of HDW catalyst. In an embodiment of the invention the proportion of the HDW catalyst grows towards the outlet end of the reactor system. The last catalyst bed in the main reaction phase typically comprises only of HDW catalyst.

The proportion of HDO and HDW catalysts in the catalyst combination may vary depending on the feed material and the amount of hetero atoms, aromatic compounds and other impurities therein. The proportion of NiW and zeolite in the NiW/zeolite catalyst may also vary. As a general rule, NiW is the most abundant of the active catalysts in the reactor system. The skilled person will be able to select suitable catalyst compositions based on his knowledge of the feed, the reaction parameters and the desired distillate specification(s). For instance, a feed having a high amount of aromatics will require a relatively higher amount of HDW catalyst for cracking than is necessary for a feed with a low amount of aromatics.

In an embodiment of the invention the reactor system contains one main reaction phase. The first catalyst bed calculated in the flow direction of the main phase contains a combination of 50, 60, 70, 80, 90 or 95% by weight HDO catalyst and 5, 10, 20, 30, 40 or 50% by weight HDW catalyst. The last catalyst bed of the main phase contains 100% by weight HDW catalyst. In an embodiment there is a middle catalyst bed which contains 5, 10, 20, 30 or 50% by weight HDO catalyst and 50, 60, 70, 80, 90 or 95% by weight HDW catalyst.

In a specific embodiment the reactor system comprises a main phase with several catalyst beds operating in series. In an embodiment the first catalyst bed comprises 75 to 95% by weight $NiMo/Al_2O_3$ or $CoMo/Al_2O_3$ catalyst and 5 to 25% by weight $NiW/zeolite/Al_2O_3$ catalyst. The second catalyst bed comprises 2 to 15% by weight $NiMo/Al_2O_3$ or $CoMo/Al_2O_3$ catalyst and 85 to 98% by weight $NiW/zeolite/Al_2O_3$ catalyst. The third and fourth catalyst beds both comprise 100% $NiW/Al_2O_3$ or $NiW/zeolite/Al_2O_3$ catalyst.

The reactor system in the present invention also comprises at least one catalytically active guard bed phase upstream of the main reaction phase. The purpose of the guard phase is to protect the main phase catalyst(s) from poisoning and fouling. The guard phase also prolongs the active operating time of the main phase catalysts. There are preferably two or more guard beds in series in the reactor system. The guard bed(s) may be combined in the same pressure vessel as the main catalyst beds or they may be provided in separate pressure vessel(s).

At least one of the guard beds contains active catalyst material for the removal of metals, sulphur and phosphorus present in the feed. The catalytically active materials are typically selected from Ni, Co, Mo, W, zeolites, $Al_2O_3$, $SiO_2$ and mixtures thereof.

In an embodiment of the invention at least one guard bed contains a combination of HDO catalyst and HDW catalyst. When the reactor system comprises two or more guard beds, at least one of the guard catalyst beds typically comprises HDW catalyst combined with HDO catalyst. The catalysts in question may contain the same active components as those described for the main phase above. However, the catalytic activity of the guard bed catalysts is typically lower than that of the main phase catalyst. For instance the NiMo catalyst used in a guard phase has a low hydrogenation activity and serves for demetallizing the feed, while the NiMo in the main phase has a high activity for hydrodeoxygenation. A combination of catalysts in a guard bed thus protects the main phase catalysts by removing metals, sulphur, phosphorus, etc. from the feed.

In an embodiment of the invention HDO and HDW catalysts are combined in two or more catalyst beds of the reactor system. Typically one of said catalyst beds is located in a guard phase and another one is located in a main phase. In a further embodiment at least two main catalyst beds comprise a combination of HDO and HDW catalysts.

The guard beds and/or the main catalyst beds may comprise an inert layer at the inlet ends of the reactors and also between the catalyst beds. The catalysts may also be diluted with appropriate inert mediums. Dilution of the active catalysts serves to even out the exothermic reactions and to facilitate temperature control in the reactor(s). Examples of inert media include glass spheres and silica. In one embodiment of the invention, at least one of the catalysts is diluted with an inert material.

In one embodiment, in the process of the invention the purified biological feed material is fed from a feed tank to the catalytic reactor system. The purified feed refers to the fractions (condensates) obtained from the second and the third evaporators in the combination of a heater and evaporators.

According to one embodiment of the invention the purification of the biological feed material is performed by using a heater and evaporator combination. Suitably said heater and evaporator combination comprises a heater and a series of evaporators. Suitably a combination of a heater and three evaporators is used.

According to one embodiment, the present invention relates to a process for purifying biological feed material, comprising the steps of subjecting the biological feed material to treatment in a heater to produce a first fraction comprising water and light components, and a second fraction comprising heavier components and residues, evaporating said second fraction in a first evaporator to produce a third fraction comprising water and low boiling light hydrocarbon and a fourth fraction comprising heavier components and residues, evaporating said fourth fraction in a second evaporator to produce a fifth fraction comprising mainly fatty acids and a sixth fraction comprising heavier components and residues, evaporating said sixth fraction in a third evaporator to produce a seventh fraction comprising mainly fatty acids and an eight fraction comprising heavy residues, and recovering the fifth and seventh fractions.

The heater may be a conventional heater or a falling film evaporator (falling film tube evaporator) or a plate molecular still or a thin film evaporator, suitably a falling film evaporator (FFE) or plate molecular still is used, particularly suitably a FFE is used. The conventional heater refers here to any heat exchanger—flashing apparatus combination or the like, suitable for rapid heating and condensing of the separated gaseous phase. The biological feed material is heated in the heater at the temperature from 80 to 150° C., suitably from 90 to 120° C. The heating is carried out under a pressure from 40 to 80 mbar, suitably from 45 to 65 mbar. A first fraction comprising water and some light components is separated and the second fraction comprising the heavier components and residues, such as fatty acids, resin acids, neutral substances etc. is directed to a series of evaporators. The falling film evaporator removes effectively a major amount of water present in the feed material, typically more than 50% by weight; the second fraction from the heater, containing the remaining components is directed to the first evaporator in the series of evaporators.

In the series of evaporators the first evaporator is a thin film evaporator or a short-path evaporator or a plate molecular still, suitably a thin film evaporator is used. The first evaporator operates at a temperature from 180 to 250° C., suitably from 190 to 220° C. A pressure of 40 to 80 mbar, suitably from 45 to 65 mbar is used. A third fraction containing water and low boiling light hydrocarbon components, said fraction having boiling point of 100-210° C., suitably 100-170° C. at a normal pressure, is removed and the fourth fraction (from the first evaporator) is directed to the second evaporator. When CTO is used as feed material, Crude Sulfate Turpentine (CST) is removed in the third fraction with water. Particularly suitably the heater and the first evaporator are operated under the same pressure. Suitably the same pressure vessel or pressure line is used. The liquid phase (fraction) from the first evaporator is led to a second evaporator. A thin film evaporator or plate molecular still or short path evaporator can be used, suitably the second evaporator is a short path evaporator. The second evaporator typically operates at a temperature of 200 to 350° C., suitably from 250 to 300° C. A pressure of 0.01 to 50 mbar, suitably 0.5 to 10 mbar, more suitably 1 to 5 mbar and particularly 2 to 3 mbar is used in the second evaporator. A fifth fraction comprising mainly (more than 50% by weight) fatty acids is separated and fed to a reactor feed tank and the sixth fraction (liquid phase) is led to a third evaporator.

The third evaporator may be a short path evaporator or a plate molecular still, suitably a short path evaporator is used. Typical operating conditions include a temperature of 250 to 400° C., suitably from 290 to 360° C. A pressure of 0.01 to 10 mbar, suitably 0.01 to 5 mbar, more suitably 0.1 to 2 mbar is used. From the third evaporator, the seventh fraction (distillate) and fed to the reactor feed tank. The eight fraction (the residual, very viscous fraction), amounting typically about 5% from the original feed, may be discarded or used for other purposes.

The purified biological feed may be then be directed from the reactor feed tank to the reactor system for catalytic treatment.

Optionally the feed material may be subjected to additional flashing prior to feeding to the heater, and/or the liquid material obtained from the heater is subjected to flashing prior to feeding into the first evaporator. Flashing may be carried out using any suitable manner, for example using heat-exchanger-expansion vessels where volatile components are released.

The purified feed material obtained in accordance with the process of the present invention is particularly suitable for the production of biofuels and components thereof, using catalytic hydroconversion, especially for the production of diesel, gasoline, naphtha, jet fuel, and fuel gases. Performing the evaporation in more than one step results in that boiling in the evaporation steps following the heating takes place in a more controlled manner because water is removed and low boiling components do not cause so much migrating of the impurities to the vapor phase.

Another feature of the purification/evaporation methods mentioned in the embodiments above is that the evaporation is accomplished in such a manner that the amount of residue removed by the purification is very small. For example when using CTO as feed material the combined amount of removed components, e.g. light components, water and heavy residue removed by the purification is typically less than 10% by weight of the feed. The combined amount of removed components may comprise about 2% by weight of light components (CST), water from the heater and/or first and second evaporators and about 5% heavy pitch separated in the last evaporator.

In one embodiment, where tall oil material, such as CTO is used as feed material the purification process conditions are controlled in such a way that as much as possible of the neutral components of the tall oil material are withdrawn with the recovered fractions for further utilization instead of being withdrawn with the residue, as happens in prior art depitching processes. The procedure according to this embodiment results in an improved yield of the purified CTO raw material compared to prior art processes. When this efficient CTO purification is operated in the present process with its combination(s) of HDO and HDW catalysts, a very advantageous over-all process is provided. A high level of complex structures is retained in the purified feed. These structures are efficiently hydrogenated and cracked by the combined catalysts. Fragments of the cracked complex molecules will make up for the any cracking of long paraffinic chains. Thus the whole CTO feed is put to full use and the fuel product yields from the CTO are high.

After purification the purified feed material is heated and led to the guard bed phase. There are typically from one or more guard catalyst beds arranged in series or in parallel. The guard beds contain active catalyst material, as described above, for the removal of harmful substances from the feed. Hydrogen gas is fed into the guard phase either separately or premixed with the feed. The guard phase is pressurized and heated in order to provide the desired removal of metals, and phosphorus from the feed.

From the guard phase the flow is fed to the main reaction phase. There may be several main catalyst beds operating in series or in parallel in the reactor system. Typically there are one or two main catalyst beds operating in series. In an embodiment the process is designed to operate in such a way that the feed passes through a series of main catalyst beds as a continuous flow without intermediate outlets for by-products or other side streams. The number and size of the reaction vessels can be freely designed to suit the space available, taking into consideration the desired process and flow parameters. Thus, the main reaction phase may comprise one pressure vessel or it may be split into two or more pressure vessels.

The first main catalyst bed in the flow direction typically contains a combination of HDO and HDW catalysts as described above. Additional hydrogen gas is fed to the main phase to provide sufficient reagent for the various hydrogen treatment steps.

A number of chemical reactions take place in the hydroprocessing reactions in the catalyst beds. These reactions are well known as such and are not described in detail herein. The biological compounds containing oxygen, sulphur and nitrogen react with the hydrogen and form water, hydrogen sulphide, ammonia, carbon dioxide and carbon monoxide as by-products. The main hydroprocessing products are paraffinic hydrocarbons in the $C_{16}$-$C_{20}$ range. The long carbon chains of the fatty acids are isomerized, which improves the cold flow properties of the resulting fuel. In the present invention, the isomerisation takes place before, after or simultaneously with the hydrodeoxygenation due to the combination of HDO and HDW catalysts and the packing of the catalyst material. Olefins and aromatic compounds are hydrogenated and fused ring systems are broken. This reduces the complexity of the compounds and improves the quality of the fuel. Cracking of large molecules, side chains and of some of the long chains occurs, results in an increase of smaller useful molecules but also causes an increase in light gas products (methane, ethane, propane and butane).

Since the catalysts are combined in the catalyst bed(s) hydrogenation, isomerisation, hydrodeoxygenation, dearomatisation and hydrocracking take place simultaneously. Since most of the reactions are exothermic, the temperature has a tendency to rise. In an embodiment of the invention hydrogen is fed into the main reaction phase as quench gas to control the temperature. Quench gas may also be added to one or more of the guard beds to ascertain that the temperature does not rise too high.

From the first catalyst bed in the main reaction phase the flow passes to the second catalyst bed, where the proportion of HDO catalyst is typically lower than in the first catalyst bed. In case there are only two catalyst beds in the reactor system, the second bed will comprise mainly or only HDW catalyst. In case there are several beds, the second bed will comprise also HDO catalyst but in a minor proportion compared to the first bed. Typically the last bed in the main catalyst bed series contains only HDW catalyst. This makes it possible to control the isomerisation and to adjust the degree of isomerisation and cracking to a suitable level according to the required ignition and cold flow properties of the fuel product.

Due to the multifunctional catalyst combination, a complex biological feed material, such as CTO, which in addition to fatty acids, resin acids and neutral components contains a number of other organic compounds, can be broken down into a mixture of hydrocarbons which provides an excellent basis for fuel and fuel components.

Purification of the biological feed material, such as CTO, using the heater and evaporator combination as described above, makes it possible to process feed material containing inorganic impurities and significant amounts of water, even up to 5% by weight, without problems relating to precipitation of impurities and fouling of equipment. Thus all available valuable compounds in the biological feed material, such as neutral components in CTO, can be utilized and only about 5% by weight of heavy pitch, calculated from the feed is left. In the heating step the level of water is decreased to about 1 or even less % by weight, in the subsequent evaporation steps the amounts of water, light hydrocarbons and turpentines (CST) is decreased. The production capacity is increased, need for maintenance of the process equipment is decreased and process efficiency and economy is significantly improved.

Said purification further improves the yields and makes the present process into a highly advantageous way of providing green fuel.

In the present process it is not only the paraffins from the fatty acids which are recovered and transformed into good diesel fuel by isomerisation. A good yield of the entire feed is obtained by the simultaneously performed dearomatization and cracking. The various catalytic reactions partly counteract each others effect on the ignition and cold flow properties and the net result is an overall hydroprocessing product with acceptable characteristics for fuel use.

It is characteristic of the HDO and HDW catalysts used in the present invention that sulphur has to be present to maintain the catalytic activity of the catalysts. The zeolite in the HDW catalyst is not sensitive to poisoning by low levels of sulphur. The catalysts are typically sulphided before start up by a sulphur containing compound such as hydrogen sulphide or dimethyl disulphide. Additional sulphur during operation is needed only in case the concentration of organic sulphur in the feed material is too low. When CTO is used as the feed material, additional sulphur is generally not needed to maintain the catalytic activity of the HDO and HDW catalysts. When additional sulphur is needed, suitable sulphur compound may be added to the feed.

The amount of hydrogen gas needed for the various hydrotreatment reactions depends on the amount and type of the feed material. The amount of hydrogen needed depends also on the process conditions. Biological oils, fats and waxes typically contain fatty acids and/or triglyceride structures, which are hydrogenated and cracked in the hydrotreatment reaction forming water and long paraffinic carbon chains.

CTO is a biological raw material, which lacks triglyceride structures but does contain fatty acids and other oxygen containing compounds as well as aromatics and olefinic compounds requiring hydrogen for conversion into fuel components.

A suitable amount of hydrogen needed for the hydroprocessing and isomerization can be determined by a person having ordinary skills in the art. Provided that sufficient hydrogen is present to maintain the activity of the catalysts, the hydrogen feed amount is not critical from a technical point of view since excess hydrogen gas which is not consumed in the reactions is recirculated and used as feed and quench gas.

In the present invention, the pressure in the reactor can vary from about 10 to about 250 bar, preferably about 80 to about 110 bar.

The HDO and HDW treatments in the reactor are carried out at a temperature in the range of about 280° C. to about 450° C., preferably at about 350° C. to about 40° C.

The purified feed material is pumped to the reactor at a desired speed. The feed rate WHSV (weight hourly spatial velocity) of the feed material is proportional to an amount of the catalyst: the WHSV is calculated according to the following equation:

$$WHSV[h^{-1}] = \frac{V_{feed[g/h]}}{m_{catalyst[g]}}$$

wherein $V_{feed[g/h]}$ means the pumping velocity of the feed material, and $m_{catalyst[g]}$ means the amount of the catalyst.

The WHSV of the feed material in the present invention varies between 0.1 and 5, and is preferably in the range of 0.3-0.7.

The ratio of $H_2$/feed in the present invention varies between 600 and 4000 Nl/l, and is preferably in the range of 1300-2200 Nl/l.

The hydroprocessing steps are highly exothermic reactions in which the temperature can rise to a level which is detrimental to the stability of the catalyst and/or product quality. In some cases, it may be necessary to control the temperature variations. Recirculation of at least a portion of the liquid hydrocarbon product stream and/or effluent gas provides an efficient means for constraining the exothermic reaction whereby the recycled streams act as media for lowering the temperature of the catalyst beds in a controlled manner.

The hydrocarbon mixture obtained from the reactor system includes fuel grade hydrocarbons having a boiling point of at most 380° C. according to ISO EN 3405.

The product from the hydroprocessing reactor system is drawn off from the outlet of the last main catalyst bed. In one embodiment of the invention water and light gases containing hydrogen, light hydrocarbons, $H_2S$, CO and $CO_2$ are separated from the liquid hydrocarbon product. The separation may be performed e.g. by cooling or flashing. Water and gases may also be separated by other means which are well known to those skilled in the art.

In an embodiment of the invention the light gases are directed for purification to an amine scrubber, which removes $H_2S$ and $CO_2$ from the gaseous products The scrubbed gases, comprising mainly hydrogen and some impurities, are recycled to the process as feed hydrogen and quench gas.

The liquid reaction products, i.e. the mixture of higher (>C5) hydrocarbons from the separator are fed to a separation column where different fuel grade hydrocarbon fractions are recovered. From the bottom of the separation column, the heavier hydrocarbons may be recycled back to the inlet end of the apparatus and mixed into the feed before the guard reactors.

The person skilled in the art is able to vary the distilling conditions and to change the temperature cut point as desired to obtain any suitable hydrocarbon product.

The recovered middle distillate fraction may comprise gas oil, i.e. a hydrocarbon fraction having a boiling point in the diesel range. A typical boiling point is from 160° C. to 380° C., meeting characteristics of the specification of EN 590 diesel. The diesel product may be fed to a diesel storage tank. Also hydrocarbon fractions distilling at temperatures ranging from 40° C. to 210° C. and at a temperature of about 370° C. can be recovered. These fractions are useful as high quality gasoline fuel and/or naphtha fuel, or as blending components for these fuels.

The process of the present invention can be realized in any typical apparatus for producing biofuel or biofuel components, which includes the specific catalyst bed(s) of the invention. An apparatus adapted for realizing an embodiment of the process of the invention comprises a catalytically active guard phase and main reaction phase. At least one of said phases comprises a catalyst bed, in which HDO and HDW catalysts are combined with each other. In an embodiment of the invention, the catalysts are mixed with each other either by physical mixing of catalyst particles or by providing both types of catalysts on the same support material.

A main reaction phase for use in the hydrodeoxygenation and hydrodewaxing process of the invention may comprise inert layers and trap layers for distributing the flow and/or trap impurities in addition to the active catalyst bed(s) with a combination of HDO and HDW catalysts.

Between the active catalyst beds there may be provided space for the introduction of cooling quench gas. Quench gas may also be introduced into the active bed(s).

FIG. 1 shows a diagram illustrating an embodiment of the process of the invention. In the process, fresh feed material 1 is fed to a heater 20, and the first fraction 30 comprising water and some light compounds is withdrawn as a distillate and the second fraction 31 comprising higher boiling components such as fatty acids, resin acids, neutral substances and residual compounds is fed to a first evaporator 21. The third fraction 32 comprising water and light hydrocarbons is withdrawn as a distillate and the fourth fraction 35 31 comprising higher boiling components such as fatty acids, resin acids, neutral substances and residual compounds is fed to a second evaporator 22. The fifth fraction 33 comprising mainly fatty acids is withdrawn as a distillate and it is directed to a feed tank 2 and the sixth fraction 36 comprising residue components and heavy neutral substances is directed to a third evaporator 23. The seventh fraction, i.e. the product fraction 34 comprising fatty acids, resin acids and light neutral substances is directed to the feed tank 2 and the eighth residue fraction 37 is withdrawn. The obtained purified feed is directed from tank 2 towards the reactor system 5. The purified feed is optionally combined with a heavy fraction 12 recirculated from the fractionation 8. The feed from feed tank is mixed with hydrogen 3 and directed to the guard bed phase of the reactor system 5.

The guard bed phase comprises bed(s) with active catalyst(s) for removal of harmful compounds such as metals and phosphorus. One or more of the guard beds may comprise a catalyst bed in which HDW catalyst is mixed with HDO catalyst. The harmful compounds are retained in the guard bed(s)

From the guard phase the flow passes on to the main reaction phase in the reactor system 5 and is mixed with additional hydrogen to maintain hydrogen pressure and to cool the flow.

The main reaction phase comprises one or more active catalyst beds for the hydroprocessing. At least one catalyst bed comprises a combination of HDO and HDW catalysts.

The catalysts comprise for example $NiMo/Al_2O_3$, optionally comprising zeolite, as HDO catalyst and $NiW/zeolite/Al_2O_3$ as HDW catalyst. When there are more than one catalyst beds, the last bed of the main reaction phase comprises only HDW catalyst.

From the bottom of the reactor system 5, the hydroprocessing product passes to a separator 6 for separating water and light gases from the liquid hydrocarbon product flow. After purification a part of the gases are recycled to the inlet end of the reactor system 5 to provide hydrogen reagent as well as quench gas (not shown) for cooling the main and/or guard reactors. Fresh make-up hydrogen is provided from hydrogen source 7.

The liquid hydrocarbon product flow is passed on to a fractionator 8, where the distillation provides hydrocarbon fractions boiling in desired ranges. Typically a middle distillate or diesel fraction is recovered at 9, a naphtha fraction is recovered at 10, a light fraction is recovered at the top 11 and a heavy fraction is taken out at the bottom 12. All or a part of the heavy fraction is recirculated to the fresh feed line and fed into the reactor system 5.

The following examples are presented for further illustration of embodiments of the invention.

Reference Example 1

Crude tall oil is processed in a laboratory scale reactor packed with HDO catalyst containing $NiMo/Al_2O_3$. The reaction conditions are shown in Table 1

TABLE 1

| Parameter | Value |
| --- | --- |
| WSHV | 0.49 |
| $H_2$/CTO rate (Nl/l) | 1973 |
| Pressure (bar) | 90 |
| Temperature (° C.) | 369 |

The distillate of the liquid hydrocarbon product is bright in color and has the data shown in Table 2.

TABLE 2

| Yield result | Value (C. °) |
| --- | --- |
| IBP | 247 |
| 5 | 304 |
| 10 | 297 |
| 15 | 304 |
| 20 | 305 |
| 30 | 309 |
| 40 | 311 |
| 50 | 314 |
| 60 | 318 |
| 70 | 326 |
| 80 | 341 |
| 85 | 360 |
| 90 | 386 |
| FP | 61 |
| CP | +16 |
| CFPP | +10 |

Figure 2:
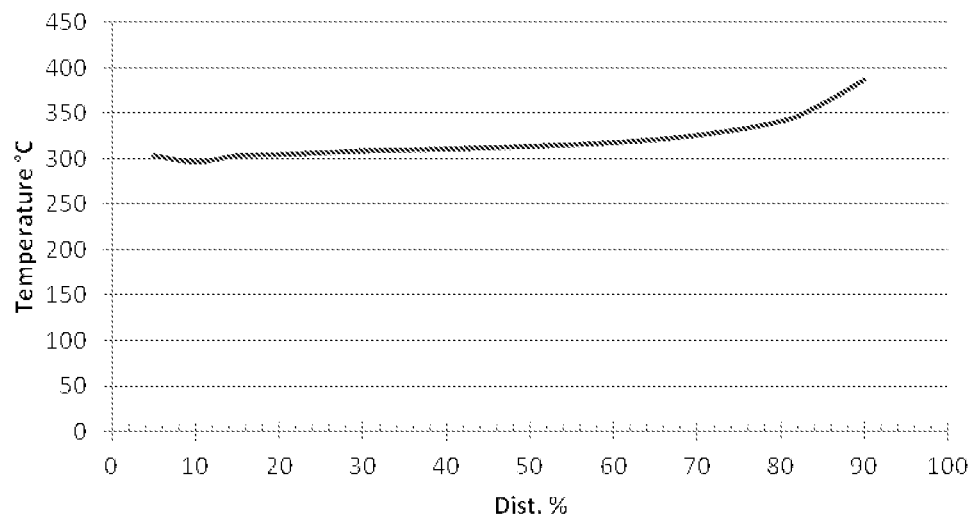
FIG. 2 shows a distillation curve of the distillate from Reference Example 1.

A distillation curve of the distillate is shown in FIG. 2.

The result obtained with the HDO catalyst alone are not satisfactory for fuel use because of its poor cold flow properties. The ratio of iso to n-paraffines is 0.5. A residue of 7% of the product does not distill at all at the temperatures used.

Reference Example 2

Crude tall oil is processed in a laboratory scale reactor packed with HDW catalyst containing NiW/Al$_2$O$_3$. The reaction conditions are shown in Table 3.

TABLE 3

| Parameter | Value |
| --- | --- |
| WSHV | 0.68 |
| H$_2$/CTO rate (Nl/l) | 1260 |
| Pressure (bar) | 80 |
| Temperature (° C.) | 369 |

The distillate of liquid hydrocarbon product has the data shown in Table 4.

TABLE 4

| Yield result | Value (C. °) |
| --- | --- |
| IBP | 94 |
| 5 | 130 |
| 10 | 152 |
| 15 | 170 |
| 20 | 190 |
| 30 | 231 |
| 40 | 263 |
| 50 | 279 |
| 60 | 287 |
| 70 | 293 |
| 80 | 298 |
| 85 | 300 |
| 90 | 305 |
| 95 | 317 |
| FBP | 333 |
| FP | 61 |
| CP | −8 |
| CFPP | −2 |

Figure 3:
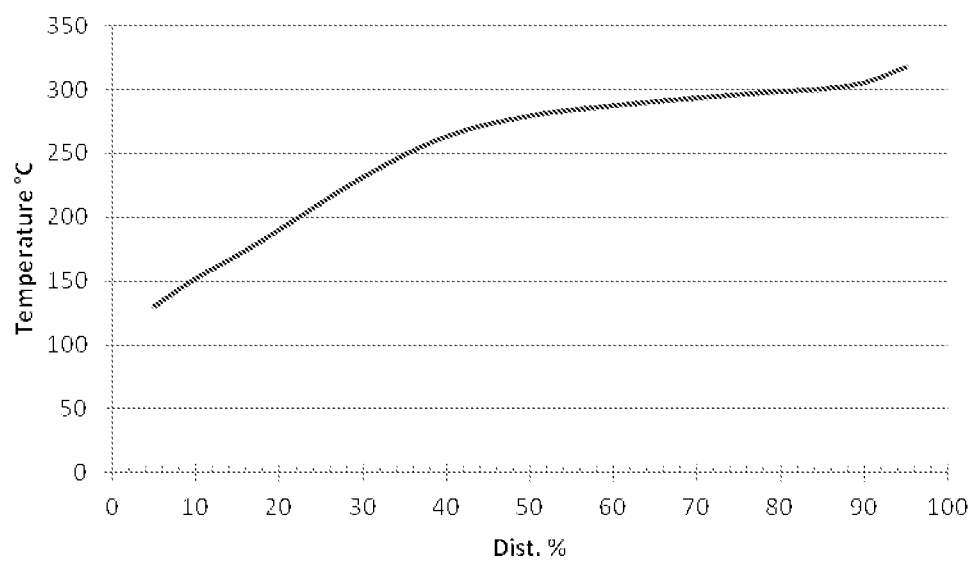
FIG. 3 shows a distillation curve of the distillate from Reference Example 2.

A distillation curve of the hydrocarbon yield is shown in FIG. 3.

The result obtained with the HDW catalyst alone has fairly good cold flow properties. The iso to n-paraffin ratio is 2.6. However, the yield of middle distillate product is not satisfactory.

Reference Example 3

Crude tall oil is processed in a laboratory scale reactor packed with a HDO and HDW catalyst. The HDO catalyst comprises 21 g of NiMo/Al$_2$O$_3$ and HDW catalyst comprises 6 g of NiW/Al$_2$O$_3$. The reaction conditions are shown in Table 5.

TABLE 5

| Parameter | Value |
| --- | --- |
| WSHV (h$^{-1}$) | 0.6 |
| H$_2$/CTO rate (Nl/l) | 1310 |
| Pressure (bar) | 70 |
| Temperature (° C.) | 373 |

The liquid hydrocarbon product has the data shown in Table 6.

TABLE 6

| Yield result | Value (C. °) Total hydrocarbons |
| --- | --- |
| IBP | 105 |
| 5 | 148 |
| 10 | 173 |
| 15 | 201 |
| 20 | 229 |
| 30 | 273 |
| 40 | 292 |
| 50 | 299 |
| 60 | 303 |
| 70 | 309 |
| 80 | 316 |
| 85 | 325 |
| 90 | 346 |
| 95 | 393 |
| FBP | 398 |

Figure 4:
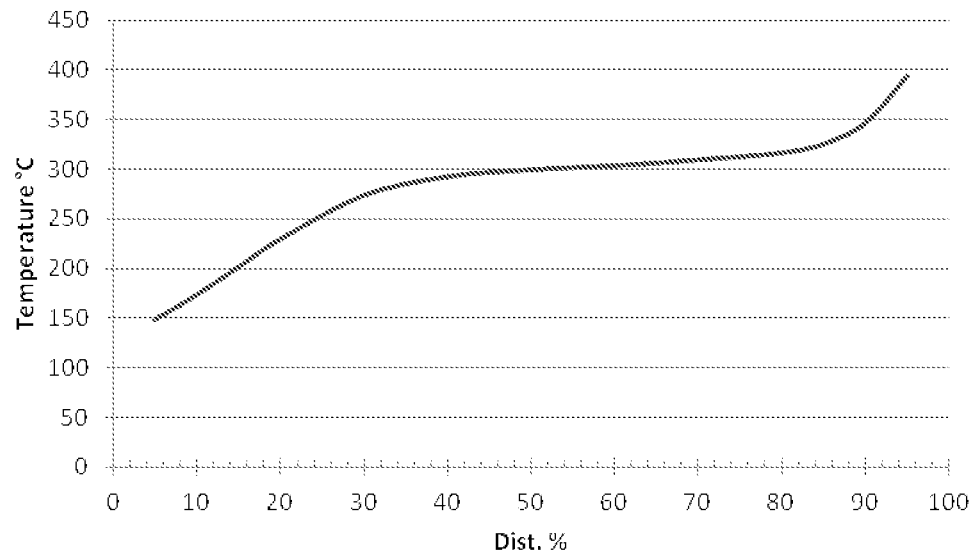
FIG. 4 shows a distillation curve of the distillate from Reference Example 3.

The distillation curve is shown in FIG. 4. The curve indicates a good distribution of paraffinic hydrocarbons and a good middle distillate yield. However, the ratio of iso to n paraffins is about 1 and the cold flow properties of the middle distillate are not satisfactory for diesel fuel use. The residue comprises 1.6%.

Example 1

The composition of four catalyst layers of a main reaction phase of a reactor system for use in the process according to the invention are shown in Table 7.

TABLE 7

| Layer No. | NiW/zeolite/Al$_2$O$_3$ (w %) | NiMo/Al$_2$O$_3$ (w %) |
| --- | --- | --- |
| 1 | 20 | 80 |
| 2 | 90 | 10 |
| 3 | 95 | 5 |
| 4 | 100 | 0 |

Example 2

Crude tall oil having the acid value and composition presented in table 8 was purified.

TABLE 8

| | |
| --- | --- |
| Acid value | 130.6 |
| Rosin acids (%) | 22.8 |
| Fatty acids (%) | 44.4 |
| Neutral substances (%) | 31.7 |
| Water | 1.1 |

CTO is purified by subjecting it to treatment in heater (suitably falling film evaporator) at a temperature of 120° C. and under a pressure of 50 mbar, and 0.6% by weight of water calculated from the total weight of feed is removed in the first fraction which is withdrawn. The second fraction (obtained from the heater) is directed to a first evaporator (thin film evaporator), which is operated at temperature of 220° C. and under a pressure of 50 mbar, using the same pressure line as the heater. 0.5% by weight of water calculated from the total weight of feed is removed in the third fraction together with 2% of light components, mainly CST, said third fraction is withdrawn. The fourth fraction obtained from the first evaporator is directed to a second evaporator (short path evaporator), which is operated at temperature of 300° C. and under a pressure of 2 mbar. The fifth fraction (obtained from the second evaporator) removed 60% by weight of the compounds calculated from the total weight of feed, mainly fatty acids. The fifth fraction (from the second evaporator) is directed to a feed tank and the remaining sixth fraction is directed to a third evaporator (short path evaporator), which is operated at temperature of 340° C. and under a pressure of 0.2 mbar. The seventh fraction (obtained from the third evaporator) containing the remaining distillable fraction is directed to the feed tank and the remaining residual heavy pitch, the eighth fraction (5% by weight calculated from the total weight of feed) is left.

Example 3

Purified CTO contained in the feed tank is combined with a stream of heavy distillate from a hydrocarbon fractionation stage and fed into a pilot reactor system according to the invention together with hydrogen gas.

The reactor system contains a guard bed phase with two catalyst beds in series. The guard beds are packed with catalysts containing Ni, Mo and W, as active metals and $SiO_2$ and $Al_2O_3$ as carrier materials and metal scavengers.

From the guard beds the purified feed flows into the main reaction phase, which comprises four catalyst beds as described in Example 1. Additional hydrogen is fed into the main reaction phase together with the feed. Hydrogen gas is also introduced between the catalyst beds.

The reaction conditions in the main reaction phase are shown in Table 9.

TABLE 9

| Parameter | Value |
| --- | --- |
| WSHV | 0.60 |
| H₂/feed rate (Nl/l) | 1480 |
| Pressure (bar) | 90 |
| Temperature (° C.) | 365 |

Water and light gaseous fractions are separated from the hydroprocessing product. The distillate of the liquid hydrocarbon product has the data indicated in Table 10 below.

TABLE 10

| Yield result | Value (C. °) |
| --- | --- |
| IBP | 59 |
| 5 | 91 |
| 10 | 109 |
| 15 | 125 |
| 20 | 138 |
| 30 | 171 |
| 40 | 208 |
| 50 | 247 |
| 60 | 273 |
| 70 | 287 |
| 80 | 295 |
| 85 | 299 |
| 90 | 304 |
| 95 | 319 |
| FBP | 347 |

Figure 5:
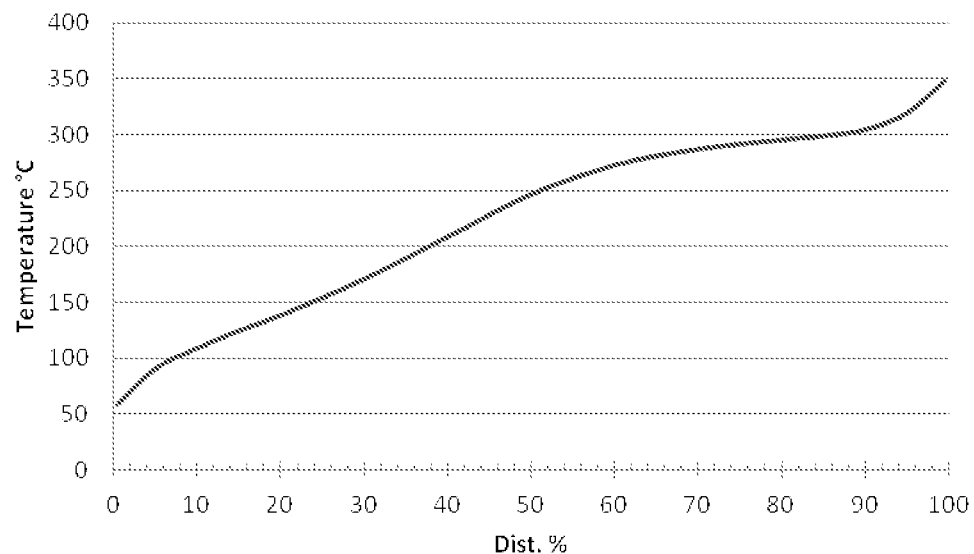
FIG. 5 shows a distillation curve of the distillate (liquid hydrocarbon product) from Example 3.

A distillation curve is shown in FIG. 5.

The liquid hydrocarbons are distilled into a light fraction, a middle distillate fraction and a heavy fraction.

Figure 6:
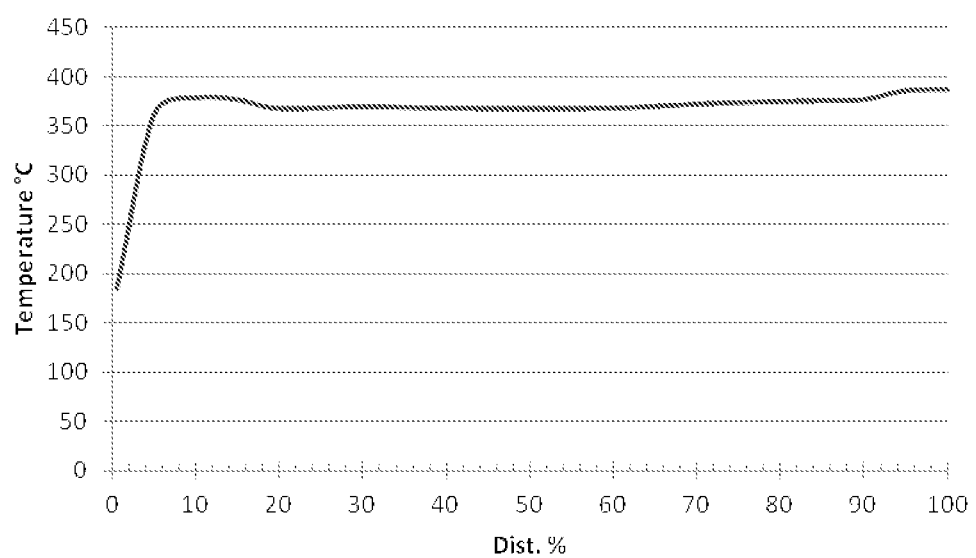
FIG. 6 shows a distillation curve of the heavy residue from Example 3.

A distillation curve of the heavy residual fraction is shown in FIG. 6.

The middle distillate provided by the process has characteristics of EN-590 diesel as indicated below in Table 11.

TABLE 11

| | |
| --- | --- |
| Residue (%) | 1.3 |
| Initial bp (° C.) | 181 |
| Final bp (° C.) | 326 |
| 50% (v/v) recovered at (° C.) | 280 |
| 90% (v/v) recovered at (° C.) | 306 |
| 95% (v/v) recovered at (° C.) | 314 |
| Paraffins % | approx. 98* |
| Aromatics % | <3** |
| Olefins % | <3** |
| Cetane number | 61 |
| FP (° C.) | 73 |
| CP (° C.) | −8 |
| CFPP (° C.) | −11 |

*= v/v alkanes including linear and cycloalkanes
**= approx. 0.7% v/v

The invention claimed is:

1. A process for the purification of biological feed material, comprising:
    purifying biological feed material by using a heater and evaporator combination, wherein the biological feed material is first treated in the heater and subsequently treated in a series of three evaporators;
    wherein the biological feed material is subjected to treatment in the heater to produce a first fraction comprising water and light components having a boiling point of 150-210° C. at normal pressure and second fraction comprising heavier components and residues, and the second fraction is directed to a first evaporator;
    wherein the biological feed material is treated in the heater at a temperature of 80 to 150° C. and under a pressure of 40 to 80 mbar to obtain a first fraction and a second fraction from the heater.

2. The process according to claim 1 where the biological feed material comprises tall oil materials.

3. A process for producing biofuel or biofuel components, comprising:
    purifying biological feed material by using a heater and evaporator combination, wherein the biological feed material is first treated in the heater and subsequently treated in a series of three evaporators to obtain purified biological feed material, wherein the biological feed material is subjected to treatment in the heater to produce a first fraction comprising water and light components having a boiling point of 150-210° C. at normal pressure and second fraction comprising heavier components and residues, and directing the second fraction to a first evaporator;
    feeding of the purified biological feed material into a reactor system, which comprises a catalytically active guard bed phase and a catalytically active main reaction phase and wherein the purified biological feed material is contacted, in at least one catalyst bed of said phases, with a combination of hydrodeoxygenating (HDO) and hydrodewaxing (HDW) catalysts,
    treating the purified biological feed material catalytically with hydrogen in the reactor system to cause hydro deoxygenation, isomerization and cracking of feed material components to provide a hydroprocessing product, and
    recovering at least a fraction of the hydroprocessing product as biofuel or biofuel components;
    wherein the biological feed material is treated in the heater at a temperature of 80 to 150° C. and under a pressure of 40 to 80 mbar to obtain a first fraction and a second fraction from the heater.

4. The process according to claim 3, wherein the combination of HDO and HDW catalysts comprises mixture(s) or layers of the catalysts.

5. The process according to claim 3, wherein said mixture(s) is/are provided by physically mixing HDO and HDW catalyst particles or by adding HDO and HDW catalyst metals onto the same support material.

6. The process according to claim 3 wherein the biological feed material comprises tall oil materials.

7. The process according to claim 3 wherein the HDO catalyst is selected from the group consisting of NiMo, CoMo and a mixture of Ni, Mo and Co on a support selected from Al2O3, SiO2 and ZrO2, and the HDW catalyst is selected from NiW/Al2O3 and NiW/zeolite/Al2O3.

8. The process according to claim 3 wherein the HDO catalyst comprises NiMo/Al2O3 and the HDW catalyst comprises NiW/zeolite/Al2O3.

9. The process according to claim 3 wherein the main reaction phase comprises two or more main catalyst beds with their respective combinations of HDO and HDW catalysts.

10. The process according to claim 3 wherein the main reaction phase comprises two or more main catalyst beds, which operate in series.

11. The process according to claim 3 wherein the proportion of the HDO catalyst at the inlet of the main reaction phase is higher than the proportion of the HDW catalyst.

12. The process according to claim 3 wherein the reactor system comprises two or more guard catalyst beds, wherein HDW catalyst is combined with HDO catalyst in at least one of the guard catalyst beds.

13. The process according to claim 3 wherein the feed after the guard bed phase passes through the main catalyst beds of the reactor system in series as a continuous flow without outlets for byproducts or other side streams.

14. The process according to claim 3 wherein water is separated from the hydroprocessing product by cooling.

15. The process according to claim 3 wherein hydrogen sulfide and carbon dioxide are separated from the gaseous hydroprocessing products by amine scrubbing.

16. The process according to claim 3 wherein a diesel fraction and a naphtha fraction are recovered and a heavy fraction is recirculated to the inlet end of the guard bed phase or the main reaction phase.

17. The process according to claim 3 wherein the feed material is treated in a heater selected from conventional heater, falling film evaporator, plate molecular still and thin film evaporator.

18. The process according to claim 3 wherein the second fraction from the heater is treated in the first evaporator selected from short path evaporator, plate molecular still and thin film evaporator.

19. The process according to claim 18 wherein the second fraction from the heater is treated in the first evaporator at a temperature of 180 to 250° C. and under a pressure of 40 to 80 mbar to obtain a third fraction and a fourth fraction from the first evaporator.

20. The process according to claim 19 wherein the fourth fraction from the first evaporator is treated in a second evaporator selected from thin film evaporator, short path evaporator and plate molecular still, preferably short path evaporator is used.

21. The process according to claim 20 wherein the fourth fraction from the first evaporator is treated in a second evaporator at a temperature of 200 to 350° C. and under a pressure of 0.01 to 50 mbar to obtain a fifth fraction and a sixth fraction from the second evaporator.

22. The process according to claim 21 wherein the sixth fraction from the second evaporator is treated in a third evaporator selected from short path evaporator and plate molecular still.

23. The process according to claim 22 wherein the sixth fraction from the second evaporator is treated a third evaporator at a temperature of 250 to 400° C. and under a pressure of 0.01 to 10 mbar to obtain a seventh fraction and a eighth fraction from the third evaporator.

24. The process according to claim 23 wherein the fifth fraction from the second evaporator and the seventh fraction from the third evaporator are used as the purified feed.

25. Fuel having characteristics meeting specification EN 590 diesel and comprising at least one hydrocarbon fraction produced by the process of claim 3.

26. The process according to claim 1 where the biological feed material is selected from crude tall oil, tall oil components, tall oil derivatives and mixtures thereof.

27. The process according to claim 3 wherein the biological feed material is selected from crude tall oil, tall oil components, tall oil derivatives and mixtures thereof.

28. The process according to claim 18 wherein the first evaporator is thin film evaporator.

29. The process according to claim 20 wherein the second evaporator is short path evaporator.

30. The process according to claim 22 wherein the third evaporator is short path evaporator.

\* \* \* \* \*